(12) United States Patent
Okada et al.

(10) Patent No.: US 7,552,516 B2
(45) Date of Patent: *Jun. 30, 2009

(54) CLAMP

(75) Inventors: Shigeo Okada, Yokohama (JP); Kouichi Katou, Yokohama (JP)

(73) Assignee: Piolax Inc, Yokohama-shi (JP)

( * ) Notice: Subject to any disclaimer, the term of this patent is extended or adjusted under 35 U.S.C. 154(b) by 151 days.

This patent is subject to a terminal disclaimer.

(21) Appl. No.: 11/543,056

(22) Filed: Oct. 5, 2006

(65) Prior Publication Data

US 2007/0033774 A1    Feb. 15, 2007

Related U.S. Application Data

(63) Continuation-in-part of application No. 11/401,409, filed on Apr. 11, 2006, now Pat. No. 7,356,886.

(30) Foreign Application Priority Data

Apr. 14, 2005  (JP)  .............................. 2005-116517
Mar. 20, 2006  (JP)  .............................. 2006-076238

(51) Int. Cl.
*F16B 5/12*  (2006.01)
*F16B 5/08*  (2006.01)

(52) U.S. Cl. .......................................... 24/297; 24/453

(58) Field of Classification Search ........... 24/289–297, 24/453
See application file for complete search history.

(56) References Cited

U.S. PATENT DOCUMENTS

| | | | | |
|---|---|---|---|---|
| 3,139,768 | A * | 7/1964 | Biesecker | ................ 74/502.4 |
| 4,865,505 | A * | 9/1989 | Okada | ........................ 411/512 |
| 5,533,237 | A * | 7/1996 | Higgins | ........................ 24/289 |
| 5,542,158 | A * | 8/1996 | Gronau et al. | ................ 24/295 |
| 6,910,827 | B2 * | 6/2005 | Maloof et al. | ............... 403/319 |
| 7,178,850 | B2 * | 2/2007 | Smith et al. | ................... 296/29 |

* cited by examiner

*Primary Examiner*—Robert J Sandy
(74) *Attorney, Agent, or Firm*—Westerman, Hattori, Daniels & Adrian, LLP.

(57) ABSTRACT

A clamp is provided having a synthetic clip and a metal plate spring. The clip includes a pair of side walls opposed each other at a certain distance, engaging shoulder portions each formed at an outer surface of each of the side walls and configured to be engaged with a peripheral edge of a mounting hole of a panel at the time of securing a mounting member to the panel. The spring is attached to one of the side walls of the clip. A press-fitting portion is formed at an inner surface of the other side wall and configured to be pressed against a boss portion of the mounting member. The spring includes a bite-into portion facing the press-fitting portion and configured to bite into the boss portion of the mounting member at the time of securing the mounting member to the panel.

17 Claims, 15 Drawing Sheets

CLAMP

This application is a continuation-in-part of Ser. No. 11/401,409, filed Apr. 11, 2006, the disclosure of which is incorporated herein by reference in its entirety.

This application claims priority under 35 U.S.C. §119 to Japanese Patent Application No. 2006-076238, filed on Mar. 20, 2006, and Japanese Patent Application No. 2006-093426, filed on Mar. 30, 2006, the disclosure of which is incorporated herein by reference in its entirety.

FIELD OF THE INVENTION

The present invention relates to a clamp, more specifically to a clamp for securing, for example, a mounting member such as a garnish of an automobile to an automotive body panel having a mounting hole utilizing bosses protruded from the rear surface of the mounting member.

BACKGROUND OF THE INVENTION

The following description sets forth the inventor's knowledge of related art and problems therein and should not be construed as an admission of knowledge in the prior art.

A conventional clamp is constituted of two members, i.e., a synthetic resin clip of a generally U-shape in cross-section and a metal plate spring of a generally U-shape in cross-section fitted inside the clip (e.g., Japanese Design Registration No. 1,212,949.) The clip includes a pair of opposing side walls, a pair of flange portions each outwardly protruded from the free end portion of each side wall, a pair of engaging shoulder portions each formed at the external surface of each wall for engaging the peripheral edge of the mounting hole of the automotive body panel in cooperation with the flange portion, and a pair of engaging portions each inwardly protruded from the inner surface of each side wall. On the other hand, the plate spring includes a pair of opposing walls each having an engaging aperture for engaging the corresponding engaging portion of the clip and having a pull-out preventing tongue portion extended obliquely downward for biting into the boss portion of the garnish.

Securing a garnish to an automotive body panel can be performed as follows. Initially, a boss portion of the garnish protruded from the rear surface of the garnish is inserted in the clamp so that the tongue portion of the plate spring bite into the sides of the boss portions. Then, in this state, the clip is inserted into a mounting hole formed in the automotive body panel until the peripheral edge portion of the mounting hole of the automotive body panel is clamped by and between the flange portion and the engaging shoulder portion of the clip from the inner and outer sides of the panel. Thus, the garnish can be secured to the automotive body panel.

In such conventional clamp, assembling the clamp, especially fitting the plate spring into the inside of the clip, was troublesome. Although the fact that the plate spring is of a U-shape in cross-section is one factor, the plate spring should be fitted into the clip by forcibly getting over the engaging portions formed on both inner surfaces of the side walls of the clip, which makes it difficult to assemble. Furthermore, in the case of inserting the boss portion of the garnish into the inside of the U-shaped plate spring, since the insertion operation cannot be performed by hand, tools are required, resulting in a troublesome insertion operation. Furthermore, since the metal plate spring is relatively expensive, the U-shaped spring causes increased production costs.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

Embodiments of the present invention have been developed in view of the above-mentioned and/or other problems in the related art. Among other advantages, some embodiments provide a clamp that is easy to assemble, some embodiments provide a clamp capable of inserting a boss portion of a garnish into the inside of the clamp without using tools, and some embodiments have reduced manufacturing costs.

According to a first aspect of the present invention, a clamp is provided for securing a mounting member to a panel having a mounting hole utilizing a boss portion protruded from a rear surface of the mounting member. The clamp comprises a synthetic clip of a generally U-shape in cross-section and a metal plate spring of a generally flat in cross-section. The clip includes a pair of side walls opposed to each other at a predetermined distance, engaging shoulder portions each formed at an outer surface of each of the side walls and configured to be engaged with a peripheral edge of the mounting hole of the panel at the time of securing the mounting member to the panel. The metal plate spring is attached to one of the side walls of the clip, wherein a press-fitting portion is formed at an inner surface of the other side wall and configured to be pressed against the boss portion of the mounting member at the time of securing the mounting member to the panel, and wherein the plate spring includes a bite-into portion facing the press-fitting portion and configured to bite into the boss portion of the mounting member at the time of securing the mounting member to the panel.

With this embodiment, although the clamp is constituted by the synthetic resin clip and the metal plate spring, the plate spring is a generally flat in cross-section. Therefore, as compared to a conventional clamp, the attaching operation for attaching the plate spring to the clip can be performed easily. Furthermore, at the time of inserting a boss portion of a mounting member into the inside of the clip, the insertion operation can be performed by simply inserting the boss portion between the bite-into portion of the plate spring and the press-fitting portion of the other side wall. Thus, the operation can be performed by hand without using any tools. Furthermore, the amount of the metal plate spring can be decreased, resulting in reduced manufacturing costs.

According to another aspect, the other side wall is provided with an inwardly protruded portion at a free end thereof, whereby the inwardly protruded portion comes into contact with the boss portion of the mounting member when the clip is inserted in the mounting hole of the panel or the clip is pulled out of the mounting hole of the panel.

In this case, when the clip is inserted in the mounting hole of the panel, the inwardly protruded portion formed at the free end of the other side wall comes into contact with the boss portion of the mounting member to prevent the inward deformation of the other side wall. Thus, it becomes possible to prevent such drawbacks that the boss portion of the mounting member can be pulled out of the mounting hole of the panel under the prescribed pulling force or the clamp remains at the mounting hole of the panel by detaching from the boss portion of the mounting member at the time of pulling the boss portion from the mounting hole of the panel.

According to another aspect, the press-fitting portion includes a press-fitting craw portion and a protruded amount of the inwardly protruded portion is smaller than that of the press-fitting craw portion.

In this case, at the time of inserting the boss portion of the mounting member into the inside of the clip, since the protruded amount of the inwardly protruded portion is smaller than that of the press-fitting craw portion of the other side wall, the insertion operation can be performed without being disturbed by the existence of the inwardly protruded portion.

According to another aspect, a plurality of press-fitting craw portions is formed at an inner surface of the press-fitting portion at different heights alternatively. This makes it possible for the press-fitting craw portions to bite into the boss portion of the mounting member.

In this case, since the plurality of press-fitting craw portions are formed at an inner surface of the press-fitting portion at different heights alternatively, it is facilitated for each press-fitting craw portion to contact with and bite into the boss portion of the mounting member.

According to another aspect, the one side wall is provided with a pair of spring holding portions for holding upper and lower edge portions of the plate spring, and the spring holding portions are disposed horizontally so that the plate spring is inserted between the spring holding portions from the lateral direction. With this structure, the plate spring would not be moved in the vertical direction, and therefore detachment of the plate spring from the one side wall can be prevented at the time of pulling out the boss portion of the mounting member from the mounting hole of the panel.

According to another aspect of the present invention, a clamp is provided for securing a mounting member to a panel having a mounting hole utilizing a boss portion protruded from a rear surface of the mounting member. The clamp comprises a synthetic clip of a generally U-shaped cross-section and a metal plate spring of a generally flat cross-section. The clip includes a pair of side walls opposed to each other at a predetermined distance, engaging shoulder portions each formed at an outer surface of each of the side walls and configured to be engaged with a peripheral edge of the mounting hole of the panel at the time of securing the mounting member to the panel. The metal plate spring is attached to one of the side walls of the clip, wherein a press-fitting portion is provided at an inner surface of the other side wall and configured to define an air space between the other side wall and the press-fitting portion, and wherein the plate spring includes a bite-into portion facing the press-fitting portion and configured to bite into the boss portion of the mounting member at the time of securing the mounting member to the panel.

With this embodiment, although the clamp is constituted by the synthetic resin clip and the metal plate spring, the plate spring is generally flat in its cross-section. Therefore, as compared to a conventional clamp, the attaching operation for attaching the plate spring to the clip can be performed easily. Furthermore, at the time of inserting a boss portion of a mounting member into the inside of the clip, the insertion operation can be easily performed since the press-fitting portion bends via the air space toward the other side wall to facilitate the insertion operation. Also, at the time of inserting the clip into the mounting hole of the panel, the insertion operation can be easily performed since the other side wall bends via the air space toward the press-fitting portion to facilitate the insertion operation. Moreover, the air space makes it possible to provide the press-fitting portion without the slits which provide elastic effect. Therefore, the boss portion can be firmly held by a wider area by extending the width of the press-fitting portion to approximately the width of the other side wall. Thus, the operation can be performed by hand without using any tools. Furthermore, the amount of metal in the plate spring can be decreased, resulting in reduced manufacturing costs.

According to another aspect, the one side wall is provided with a pair of spring holding portions for holding the plate spring wherein the pair of spring holding portions includes an upper spring holding portion and a lower spring holding portion wherein the lower spring holding portion comes into contact with the plate spring from below. With this structure, since the pair of spring holding portions are disposed at an upper and a lower part of one side wall along longitudinal direction, the plate spring would not be moved in the vertical direction, and therefore detachment of the plate spring from the one side wall can be prevented at the time of pulling out the boss portion of the mounting member from the mounting hole of the panel. In addition, at the time of inserting the boss portion into the inside of the clip, since the deformation of the plate spring can be prevented by the contact of the lower holding portion, it is possible to retain the plate spring at the boss portion side.

According to another aspect, the plate spring has a shape symmetrical about a horizontal axis and a vertical axis of the plate spring. With this structure, at the time of attaching the plate spring to the one side wall, the caretaken about the specific direction of the plate spring can be relieved by the symmetry, and the efficiency of the attaching operation can be improved.

The above and/or other aspects, features and/or advantages of various embodiments will be further appreciated in view of the following description in conjunction with the accompanying figures. Various embodiments may include and/or exclude different aspects, features and/or advantages where applicable. In addition, various embodiments may combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

A preferred embodiment of the present invention will be described with reference to the accompanying drawings, wherein.

DETAILED DESCRIPTION OF THE INVENTION

In the following paragraphs, some preferred embodiments of the invention will be described by way of example and not limitation. It should be understood based on this disclosure that various other modifications can be made by those in the art based on these illustrated embodiments.

The present application is an efficient-operation; providing an economical and novel clamp for securing a mounting member to a panel having a mounting hole utilizing a boss portion protruded from a rear surface of the mounting member, the clamp comprising a synthetic clip of a general U-shape in cross-section; and a metal plate spring of a generally flat in cross-section, wherein the clip comprises a pair of side walls opposed each other at a certain distance, engaging shoulder portions each formed at an outer surface of each of the side walls, wherein the metal plate spring is attached to one of the side walls of the clip, wherein a press-fitting portion is formed at an inner surface of the other side wall, and wherein the plate spring includes a bite-into portion configured to bite into the boss portion of the mounting member at the time of securing the mounting member to the panel.

Figure 1:
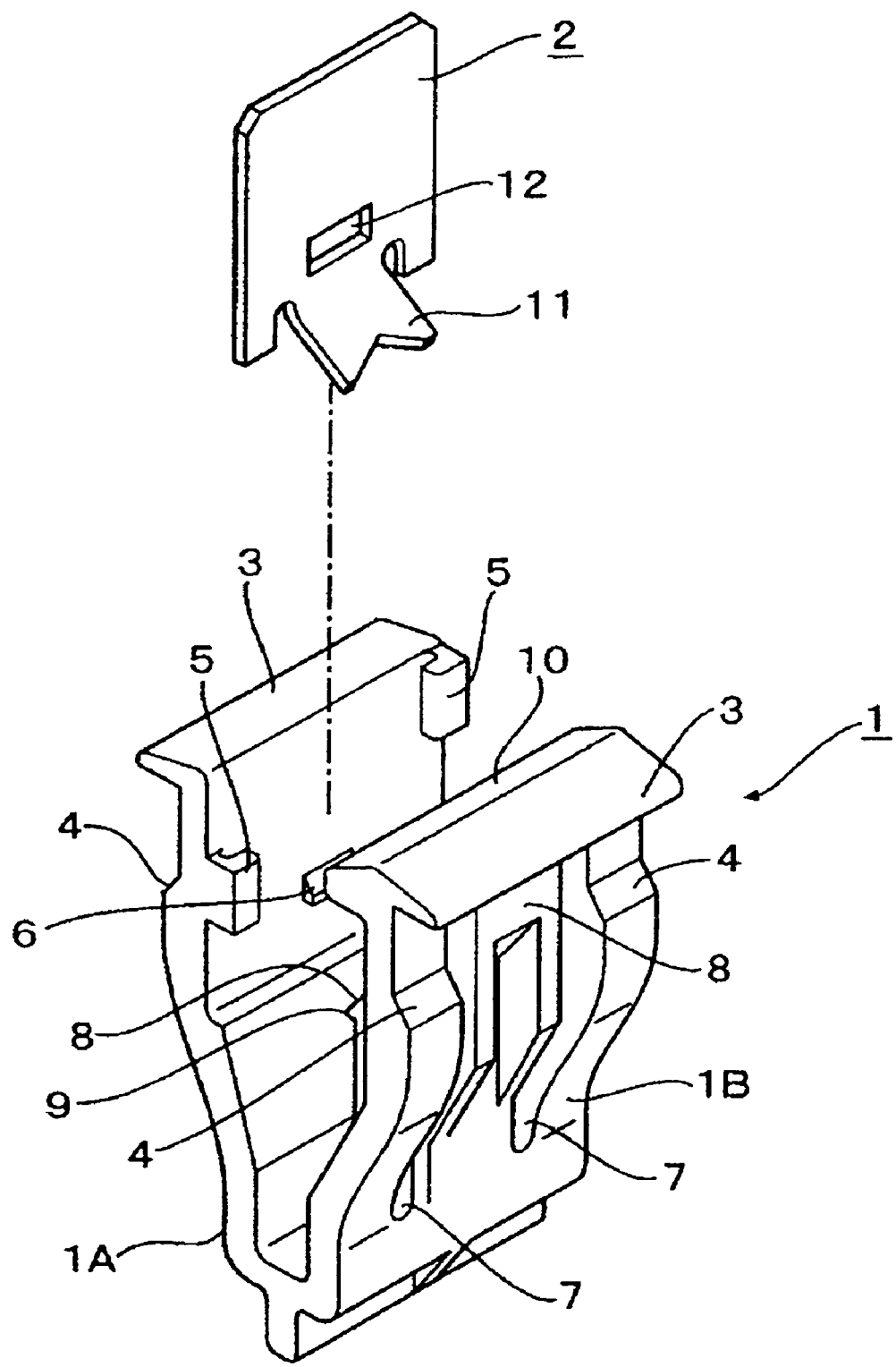
FIG. 1 is an exploded perspective view showing a clamp according to one embodiment of the present invention.

A clamp according to a first embodiment is used to secure a garnish of an automobile to an automotive body panel having mounting holes utilizing boss portions protruded from the rear surface of the garnish. As shown in FIG. 1, for example, the clamp is basically constituted by two members, i.e., a synthetic clip 1 of a generally U-shape in cross-section and a metal plate spring 2 of a generally flat shape in cross-section.

Figure 2:
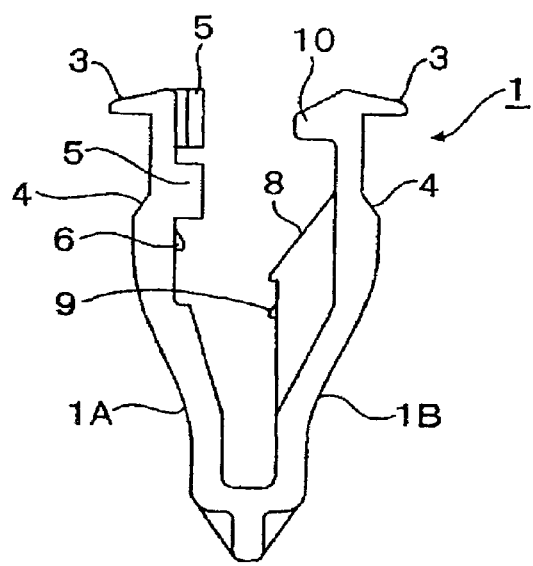
FIG. 2A is a front view showing a clip of the clamp.
FIG. 2B is a flat view of the clip.
FIG. 2C is a right side view of the clip.
FIG. 2D is a left side view of the clip.
Figure 2:
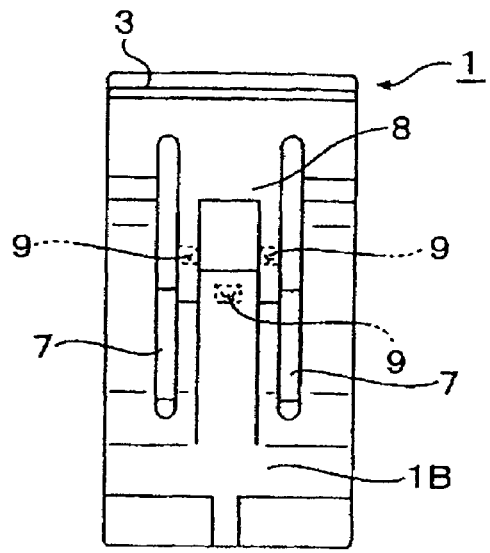
Figure 2:
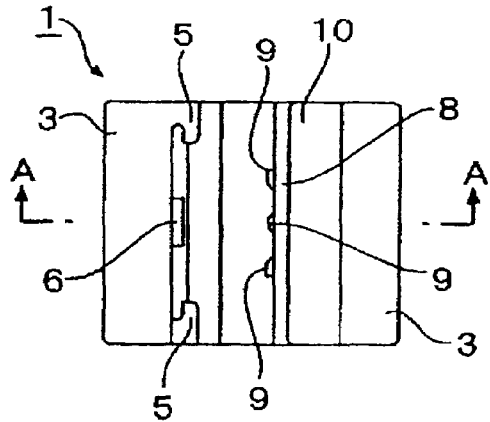
Figure 2:
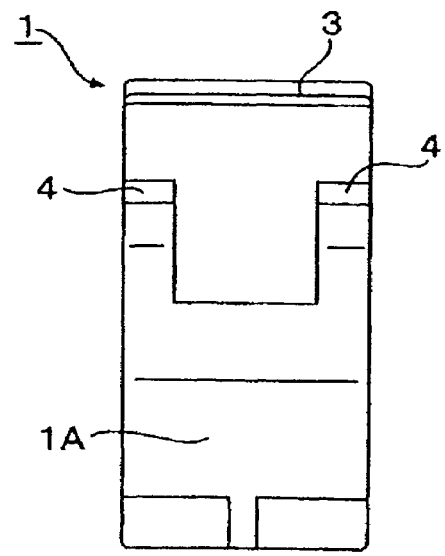
Figure 3:
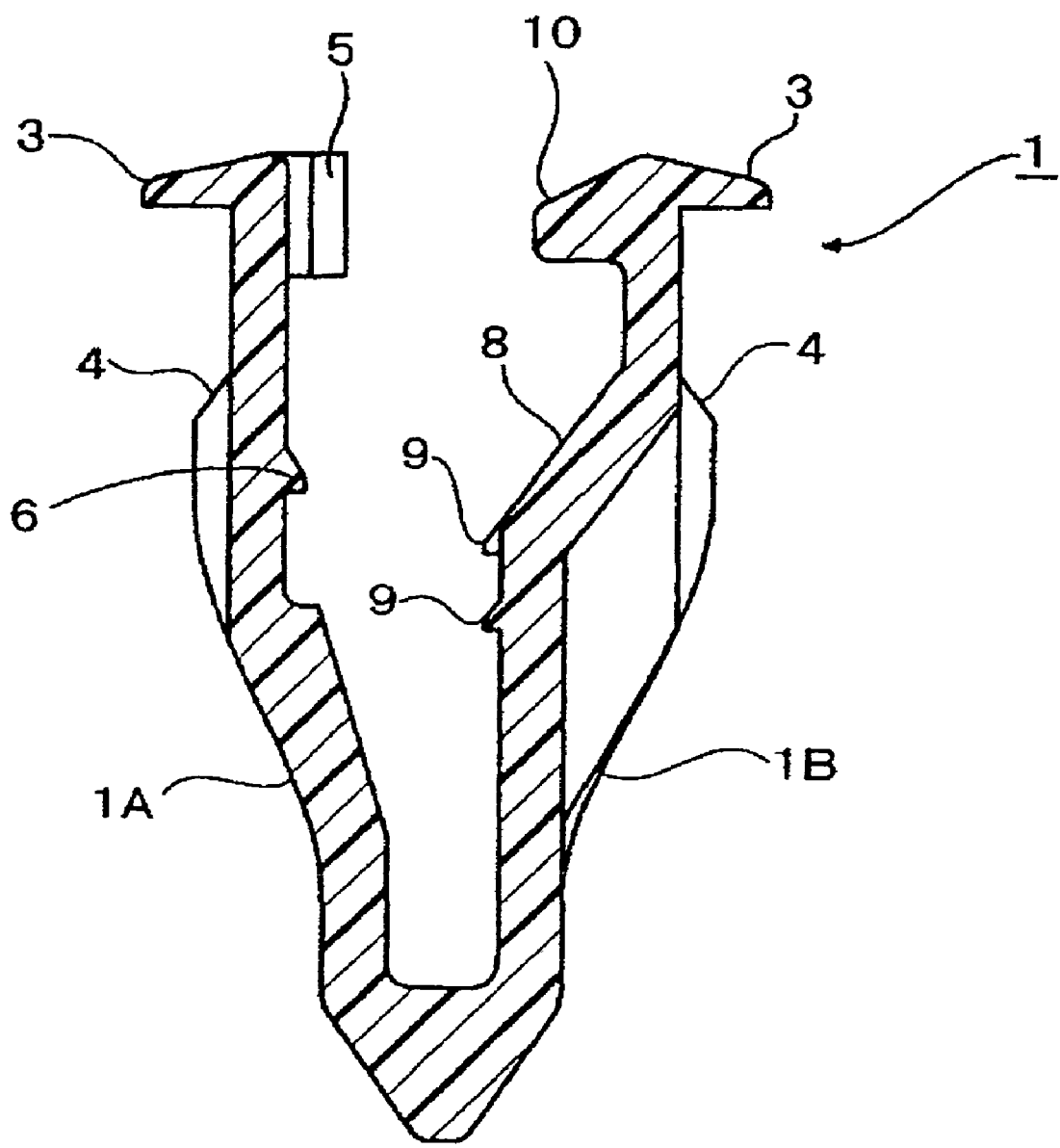
FIG. 3 is a cross-sectional view taken along the line A-A in FIG. 2B.

As shown in FIGS. 2 and 3, for example, the clip 1 is provided with a pair of opposing side walls 1A and 1B each having a flange portion 3 outwardly protruded from the free end of the side wall and an engaging shoulder portion 4 formed on the external surface of the side wall away from the flange portion 3 for engaging a peripheral edge of a mounting hole of an automotive body panel. Also, one side wall 1A has at its inner surface a pair of inverted L-shaped spring holding portions 5 for slidably fitting lateral side edges of the plate spring 2 at different heights and at its inner central portion an engaging portion 6 to be engaged with an engaging aperture portion 12 of the plate spring 2 which will be explained later.

The other side wall 1B of the clip 1 has a pair of parallel vertical slits 7 and 7 dividing the central portion of the side wall 1B and forming a divided wall portion 8. The divided wall portion 8 (to be also a press-fitting portion) has an inwardly protruded inner surface parallel to the one side wall 1A and a total of three (3) press-fitting craw portions 9, 9 and 9 alternatively formed at different heights on the inwardly protruded inner surface and configured to press against the boss portion of the garnish. Furthermore, the other side wall 1B has an inwardly protruded portion 10 inwardly protruded from the free end thereof so that the inward deformation of the other side wall 1B can be restricted by the contact of the inwardly protruded portion 10 against the boss portion of the garnish at the time of inserting the clip 1 into the mounting hole of the automotive body panel or pulling out the clip 1 from the mounting hole of the automotive body panel. The protruded amount of this inwardly protrude portion 10 should be smaller than the protruded amount of the press-fitting craw portions 9 and that of the inwardly protruded surface of the divided wall portion 8 to secure the aforementioned function.

On the other hand, the aforementioned plate spring 2 is formed to have a size capable of being inserted from above between the spring holding portions 5 and 5 formed on the one side wall 1A at different heights. As shown in FIG. 1, the plate spring 2 is provided with a pull-out preventing tongue 11 extended from the lower edge obliquely downward and configured to bite into the boss portion of the garnish and an engaging aperture 12 located above the tongue 11 and configured to be engaged with the engaging portion 6 formed on the one side wall 1A. This pull-out preventing tongue 11 is also a bite-into portion. In this first embodiment, since the width of the pull-out preventing tongue 11 is set to be wider than that of the engaging aperture 12, the rear surface of the pull-out preventing tongue 11 functions as a guiding surface at the time of inserting the plate spring 2 from the above with respect to the clip 1, which makes it possible for the plate spring 2 to smoothly slide over the engaging portion 6. This enables the engaging portion 6 to be engaged with the engaging aperture 12 easily.

As mentioned above, the metal plate spring 2 of a generally flat cross-section can be attached to the inner side of the one side wall 1A of the clip 1 by inserting both side edges of the plate spring 2 between the flange portions 5 and 5 until the engaging aperture 12 is engaged with the engaging portion 6. Accordingly, as compared to the aforementioned conventional clamp, the assembling operation of this clamp, including attaching the metal plate spring 2 to the clip 1, according to this embodiment can be performed easily since the assembling can be performed automatically In this assembled state, the pull-out preventing tongue 11 faces the three press-fitting craw portions 9, 9 and 9 arranged at different heights alternatively on the divided wall portion 8.

At the time of securing a garnish G to an automotive body panel P using the clamp of the aforementioned first embodiment, in the same manner as in a conventional clamp, initially, a boss portion B protruded from the rear surface of the garnish G is inserted in the clamp. In this embodiment, however, even if the press-fitting craw portions 9, 9 and 9 are formed on the protruded inner surface of the divided wall portion 8 of the other side wall 1B and the pull-out preventing tongue 11 is protruded from the plate spring 2, the boss portion B can be inserted in the clamp since the divided wall portion 8, to be also a press-fitting portion, divided by the vertical slits 7 and 7 can be easily bent outward. Accordingly, as compared to the aforementioned conventional clamp, since the insertion operation of the boss portion B with respect to the clip 1 can be performed very easily, the insertion operation can be executed by hand.

Furthermore, as explained above, since the inwardly protruded portion 10 formed at the free end of the other side wall 1B is smaller in protruded amount than the press-fitting craw portion 9 and the protruded inner surface of the divided side wall portion 8, the existence of the inwardly protruded portion 10 would not disturb the insertion of the boss portion B.

Figure 4:
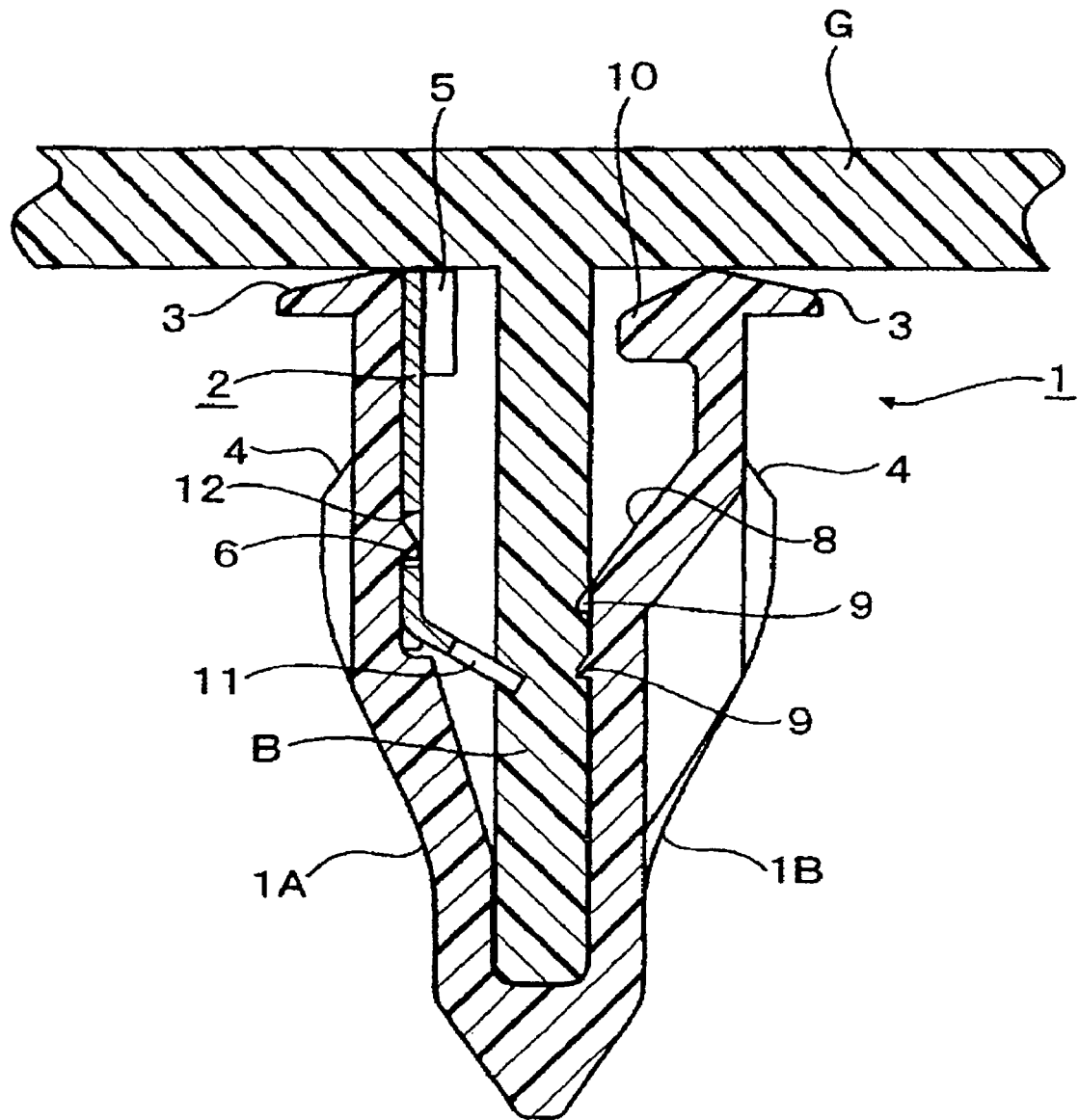
FIG. 4 is a cross-sectional view showing the state in which a boss portion of a garnish is inserted into the inside of the clamp according to one embodiment.

When the boss portion B of the garnish G is inserted in the clip 1, as shown in FIG. 4, the pull-out preventing tongue 11 of the plate spring 2 attached to the one side wall 1A of the clip 1 bites into the corresponding portion of the boss portion B and at the same time the boss portion B is forcibly pressed toward the press-fitting craw portions 9, 9 and 9. Therefore, the three press-fitting craw portions 9, 9 and 9 bite into the corresponding portions of the boss portion B while being pressed. At this time, since the three press-fitting craw portions 9, 9 and 9 are formed at different heights alternatively and away from each other, the press-fitting craw portions 9, 9 and 9 can easily bite into the boss portion B. In this state, the inwardly protruded portion 10 is not yet in contact with the boss portion B.

Figure 5:
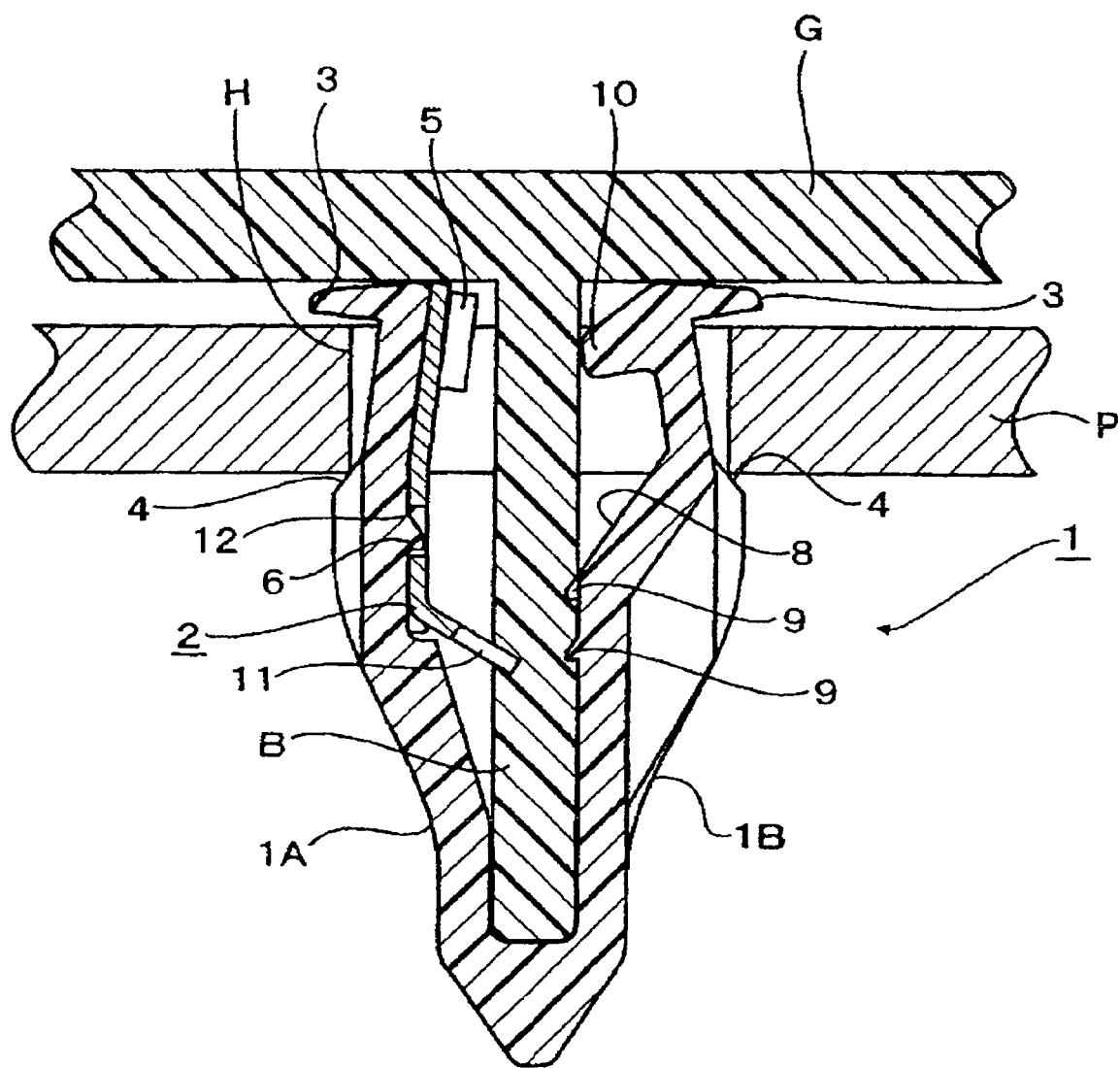
FIG. 5 is a cross-sectional view showing the state in which the garnish is fixed to an automotive body panel side.

After completion of the engagement of the pull-out preventing tongue 11 of the plate spring 2 and each press-fitting craw portion 9 against the boss portion B, while keeping this engaged state, the clip 1 is inserted into the mounting hole H previously formed in the automotive body panel P so that the peripheral edge of the mounting hole H of the automotive body panel P is clamped from the inner and outer sides of the panel P by and between the pair of flange portions 3 and the pair of engaging shoulder portions 4. As a result, as shown in FIG. 5, for example, the garnish G is assuredly secured to the automotive body panel P. In this state, the other side wall 1B is slightly bent toward the boss portion B by being pressed by the peripheral edge of the mounting hole H of the automotive body panel P, thereby bringing the inwardly protruded portion 10 into contact with the boss portion B, which assuredly prevents the further deformation of the other side wall 1B toward the inside.

At the time of detaching the garnish G from the automotive body panel P from the secured state mentioned above, even if the boss portion B is tried to be pulled out from the mounting hole H under a prescribed pulling force, the clip 1 would not be pulled out of the mounting hole H since the other side wall 1B would not be deformed inwardly. Furthermore, even if the boss portion B is forcibly pulled out from the mounting hole H, the clip 1 would not be detached from the boss portion B since the engaging shoulder portions 4 and 4 are pressed inwardly by the peripheral edge of the mounting hole H and the press-fitting craw portions 9, 9 and 9 would not be detached from the boss portion B. Accordingly, the detaching operation of the garnish G can be performed easily without causing the remaining of the clamp in the mounting hole H.

Figure 6:
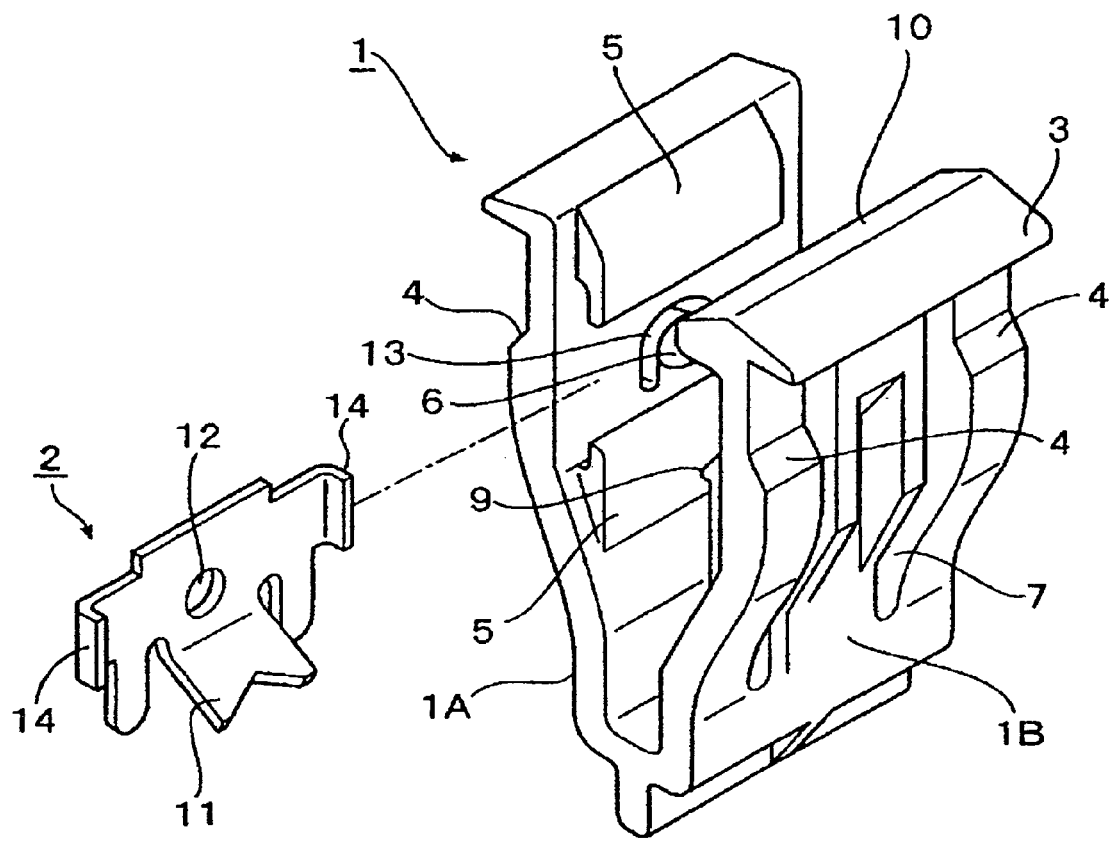
FIG. 6 is an exploded perspective view showing a clamp according to one embodiment of the present invention.

Next, a clamp according to a second embodiment will be explained. The second embodiment is basically the same as the first embodiment but different from the first embodiment in plate spring attaching structure. In detail, as shown in FIG. 6, a pair of spring holding portions 5 and 5 for holding a plate spring 2 are integrally formed on the inner surface of the one side wall 1A along the horizontal direction at a distance therebetween so that the plate spring 2 can be inserted between the spring holding portions 5 and 5 from the lateral direction. Accordingly, in this embodiment, as shown in FIG. 6, the one side wall 1A of the clip 1 is configured such that the engaging portion 6 is formed to be deformable via the inverted generally U-shaped slit 13 and a protruded ledge 14 is extended from each side edge of the plate spring 2 so that the flat-shaped plate spring 2 can be inserted from the lateral direction utilizing either one of the right and left protruded ledges 14 and 14.

Figure 7:
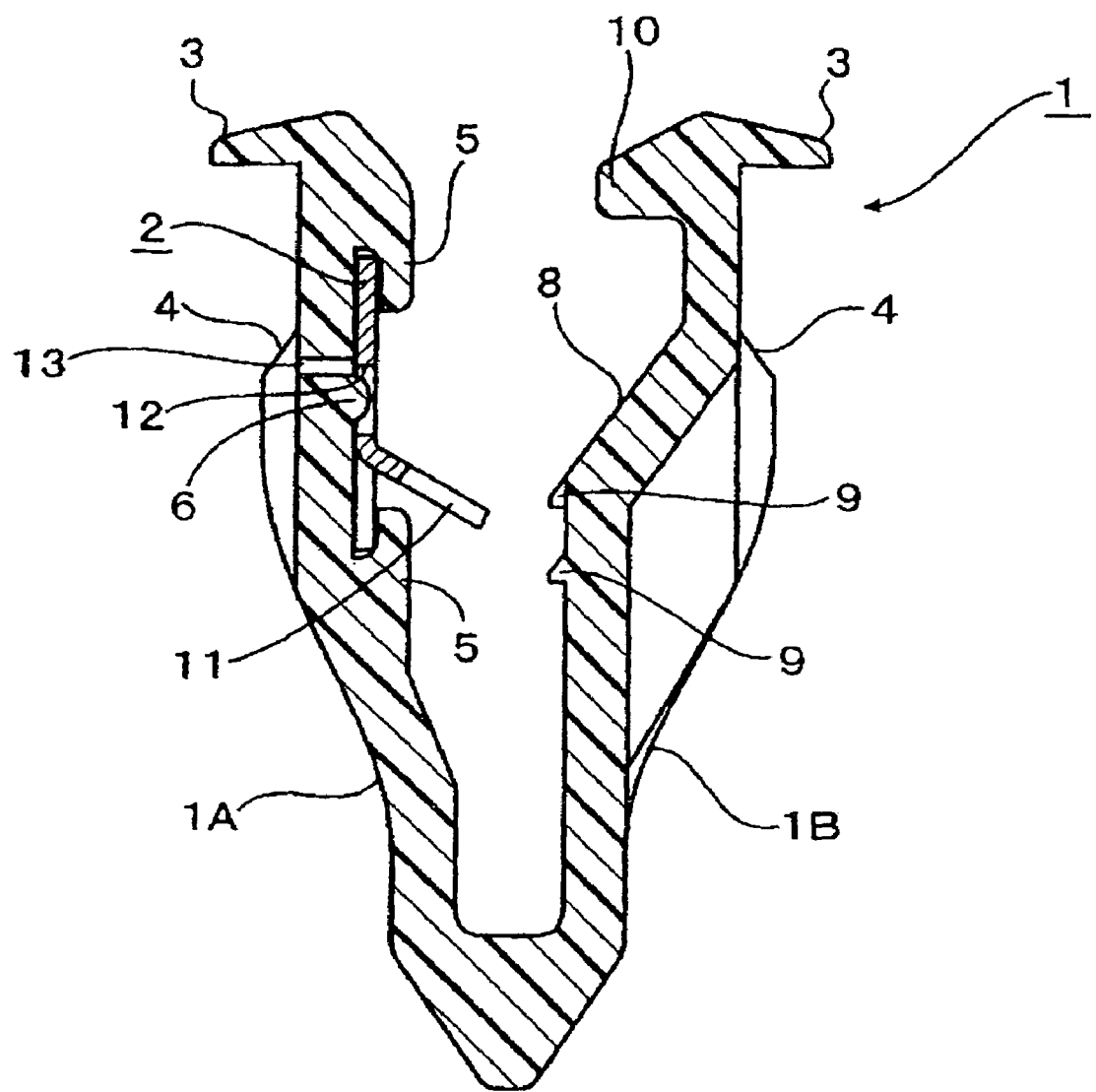
FIG. 7 is a cross-sectional view of one embodiment showing the state in which a plate spring is attached to a clip.

Accordingly, in the second embodiment, as shown in FIG. 7, for example, the plate spring 2 can be attached to the clip 1 by simply inserting the upper and lower edges of the plate spring 2 between the spring holding portions 5 and 5 from the lateral direction until the engaging portion 6 is engaged with the engaging aperture 12, resulting in an easy attachment of the plate spring 2. In this embodiment, since the spring holding portions 5 and 5 are formed horizontally, the plate spring 2 attached to the one side wall 1A would not move in the vertical direction. Accordingly, at the time of pulling out the boss portion B of the garnish G from the mounting hole H of the automotive body panel P, the plate spring 2 never detaches from the one side wall 1A. The other structure, function and effects are the same as those of the first embodiment, and therefore the explanation will be omitted here.

Figure 8:
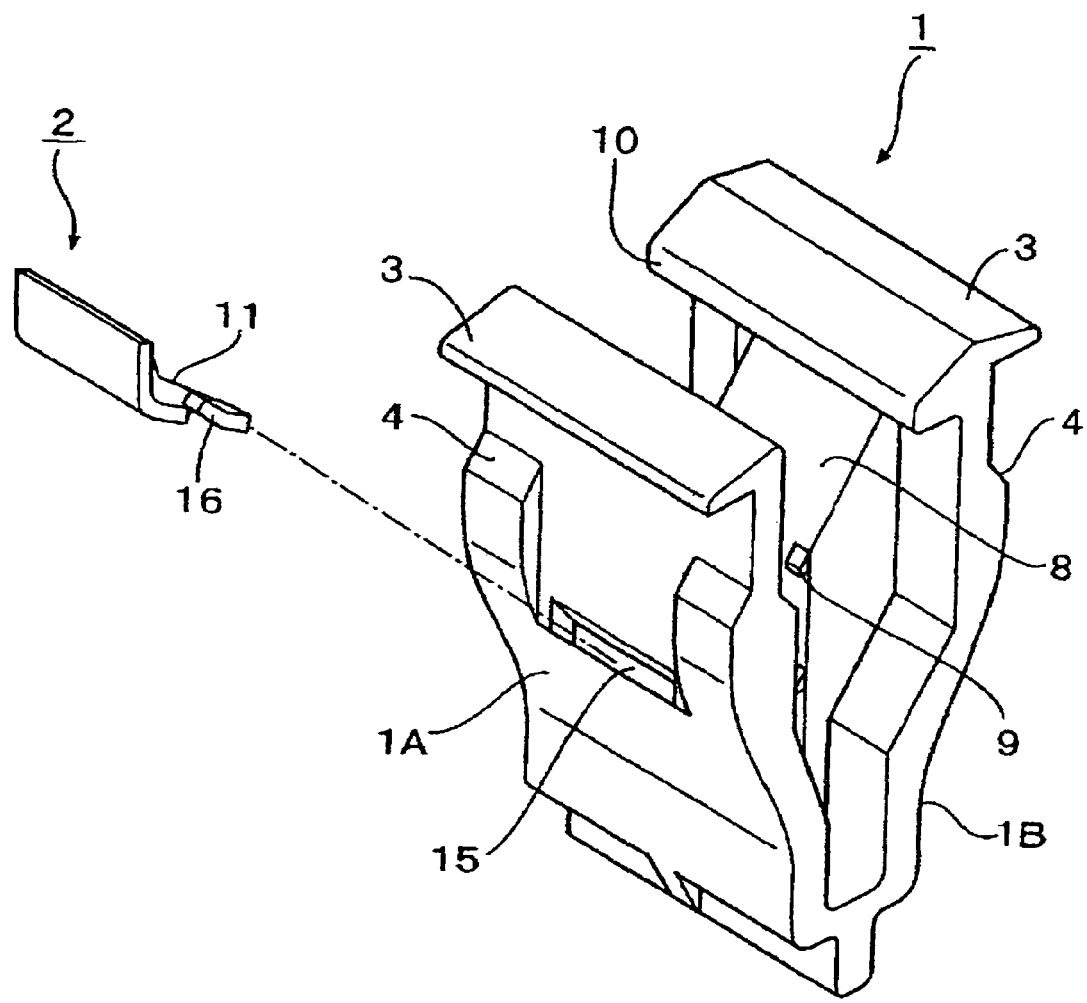
FIG. 8 is an exploded perspective view showing a clamp according to one embodiment of the present invention.

Next, a third embodiment will be explained. Like the second embodiment, the third embodiment is similar to the first embodiment However, as shown in FIG. 8, for example, the third embodiment is different from the first embodiment in that a plate spring 2 is attached to the one side wall 1A of the clip 1 by being inserted into an insertion aperture 15 formed in the one side wall 1A and extended obliquely downward. As shown in FIG. 8, for example, to enable easy insertion of the plate spring 2 into the insertion aperture 15, the upper end portion is bent with the pull-out preventing tongue 11 remained straight, and inclined retaining portions 16 and 16 to be engaged with the peripheral edge of the insertion aperture 15 are formed at both side edges of the pull-out preventing tongue 11.

Figure 9:
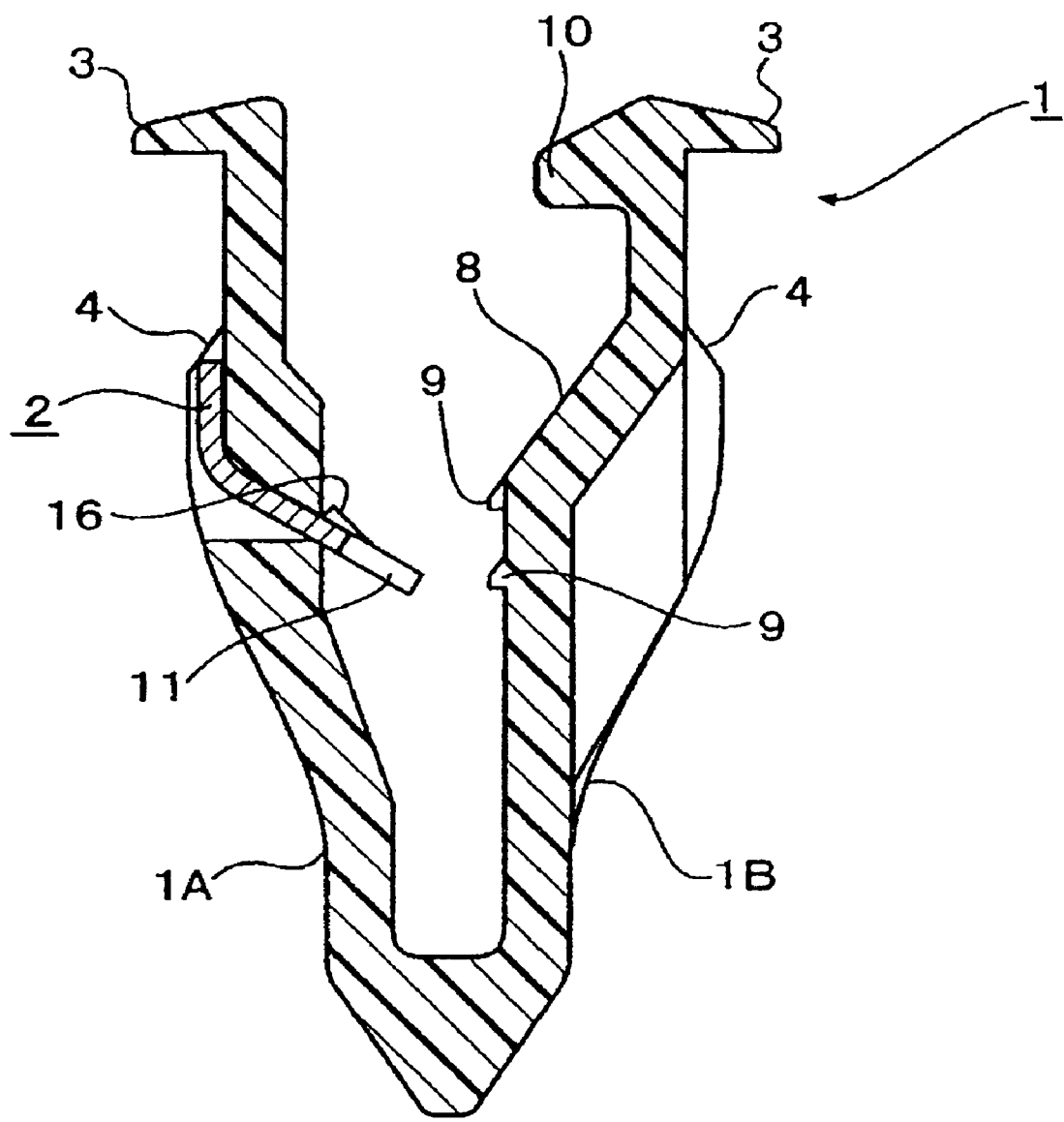
FIG. 9 is a cross-sectional view of one embodiment showing the state in which a plate spring is attached to a clip.

Accordingly, in the third embodiment, as shown in FIG. 9, for example, the plate spring 2 can be attached to the clip 1 by simply inserting the plate spring 2 from the outside into the insertion aperture 15 formed in the one side wall 1A until the retaining portions 16 and 16 are engaged with the peripheral edge of the insertion aperture 15, resulting in an easy attachment of the plate spring 2 to the clip 1. In this embodiment, the plate spring 2 attached to the one side wall 1A would not move in the vertical direction. Accordingly, at the time of pulling out the boss portion B of the garnish G from the mounting hole H of the automotive body panel P, the plate spring 2 never detaches from the one side wall 1A. The other structure, function and effects are similar to those of the first embodiment, and therefore the explanation will be omitted here.

Figure 10:
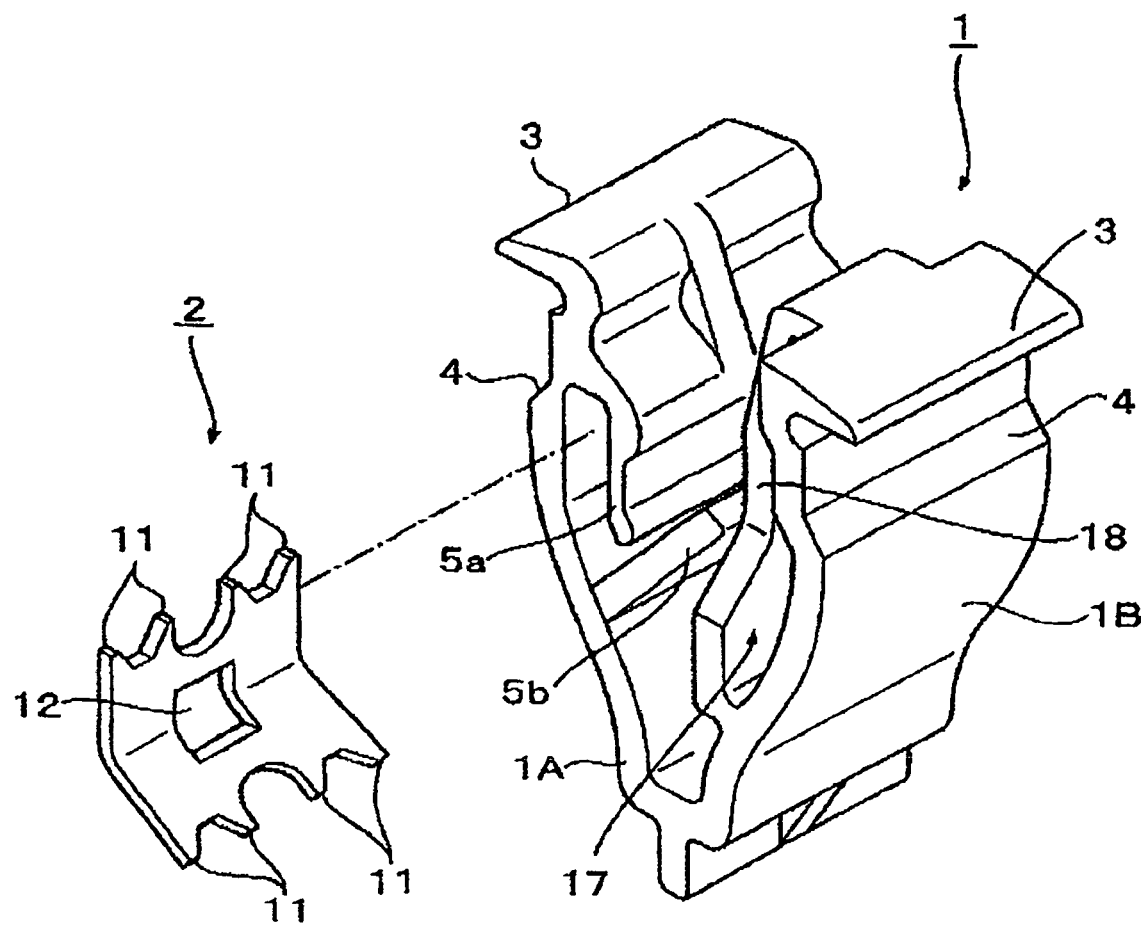
FIG. 10 is an exploded perspective view showing a clamp according to one embodiment of the present invention.

Next, a fourth embodiment will be explained. As shown in FIG. 10, the fourth embodiment basically includes a synthetic clip 1 of a general U-shape in cross-section and a metal plate spring 2, generally flat in cross-section. The clip 1 is provided with a pair of opposing side walls 1A and 1B each having, a flange portion 3 outwardly protruding from the free end of the side wall, and an engaging shoulder portion 4 formed on the external surface of the side wall away from the flange portion 3. The plate spring 2 is provided with a pull-out preventing tongue 11, extended from the lower edge obliquely downward and configured to bite into the boss portion B of the garnish G However, the fourth embodiment is different from the above embodiments in the following way.

Figure 11:
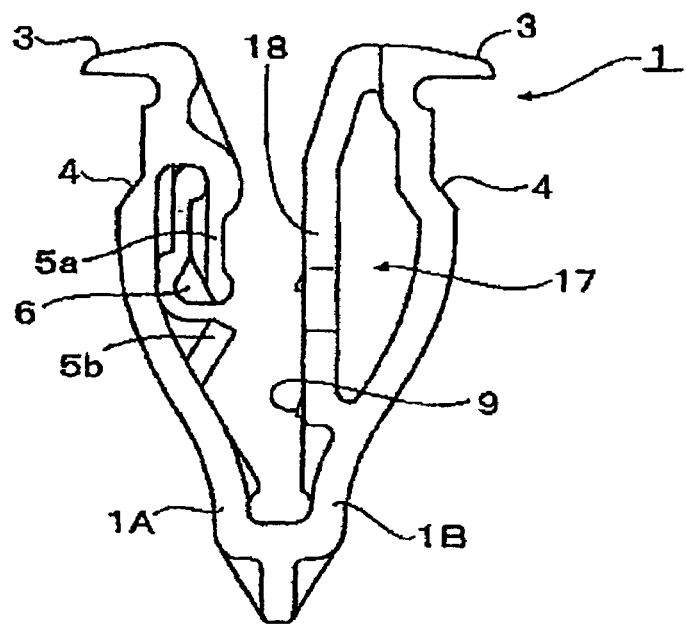
FIG. 11A is a front view showing a clip of the clamp.
FIG. 11B is a flat view of the clip.
FIG. 11C is a right side view of the clip.
Figure 11:
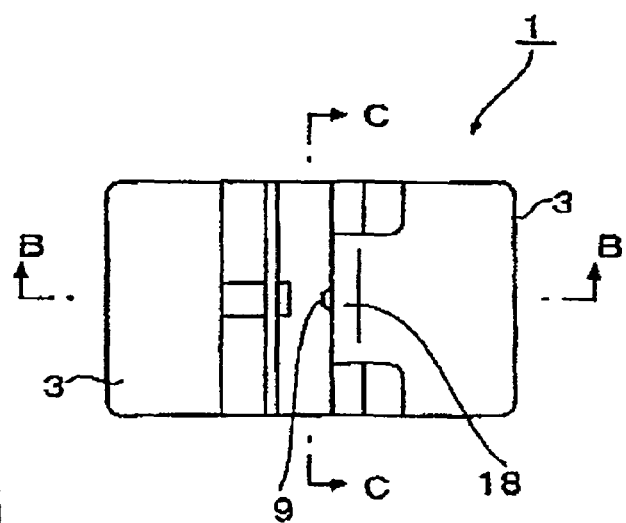
Figure 11:
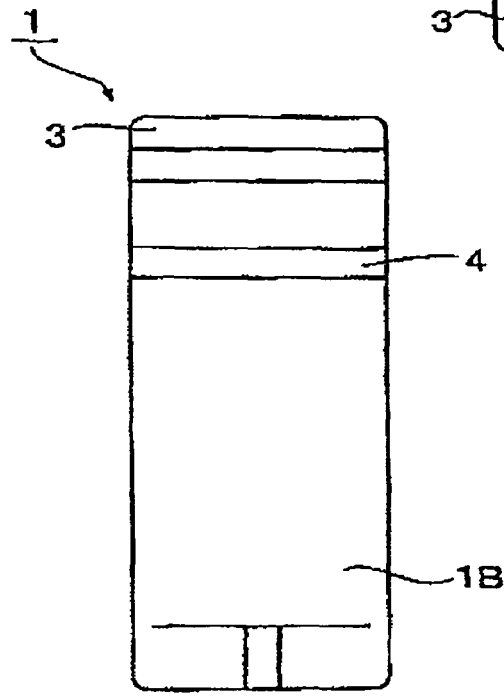
Figure 12:
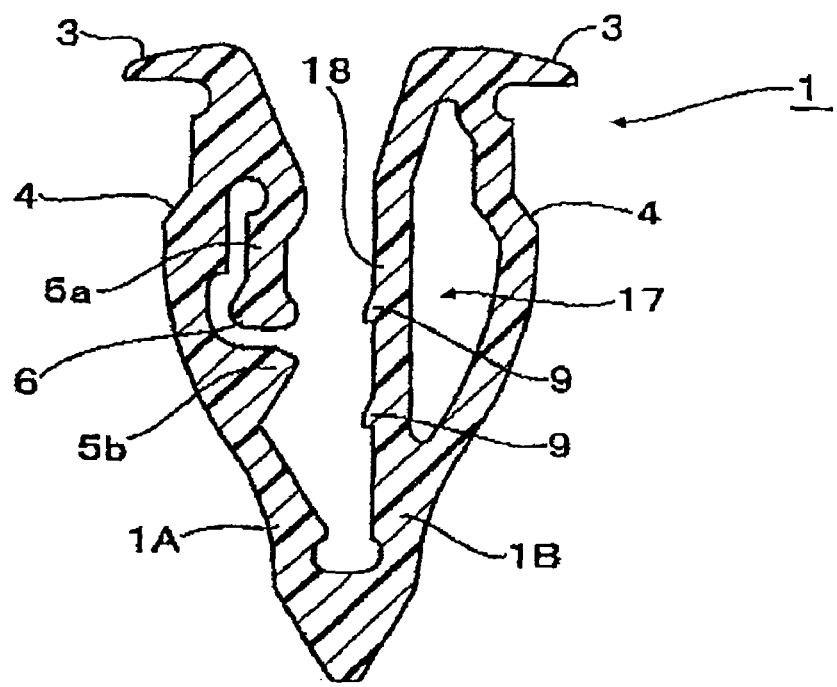
FIG. 12A is a cross-sectional view taken along the line B-B in FIG. 11B.
FIG. 12B is a cross-sectional view taken along the line C-C in FIG. 11B.
Figure 12:
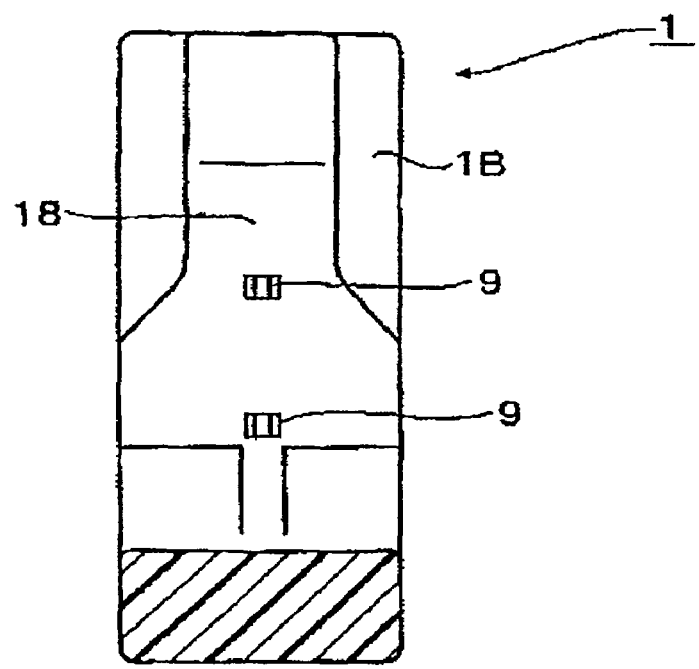
Figure 13:
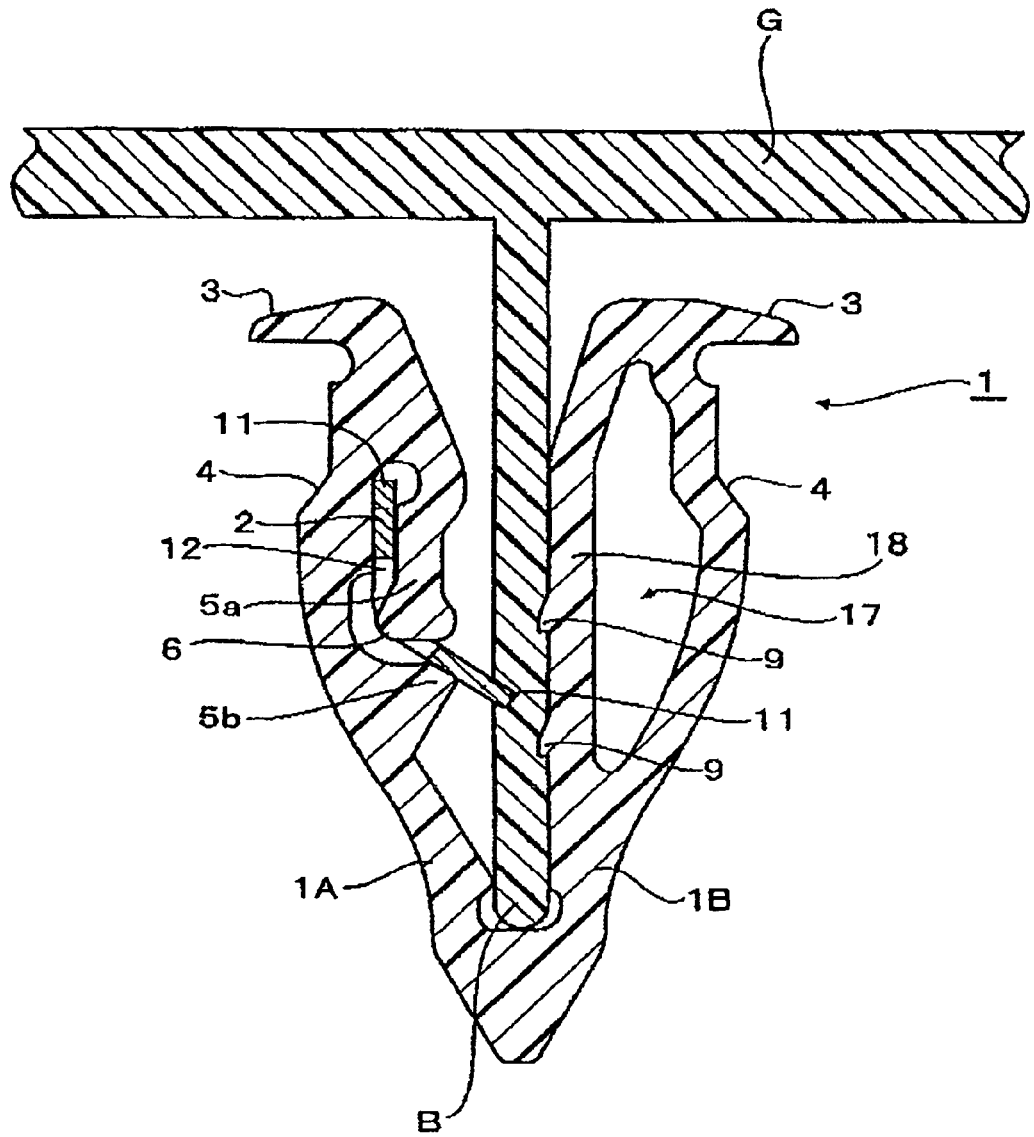
FIG. 13 is a cross-sectional view showing the state in which a boss portion of a garnish is inserted into the inside of the clamp according to one embodiment.

With respect to the clip 1, as shown in FIGS. 11 and 12, a pair of spring holding portions for holding a plate spring 2 are integrally formed on the inner surface of the one side wall 1A along the horizontal direction at a distance therebetween so that the plate spring 2 can be inserted between the spring holding portions from the lateral direction. The upper part of the spring holding portion 5a has an inverted generally U-shaped cross-section and an elastic structure. The lower part of the spring holding portion 5b has a thick and rigid structure. The upper spring holding portion 5a and the lower spring holding portion 5b extend in lateral direction and are generally parallel to each other. The lower spring holding portion 5b has a tapered shape extending toward the top end. When the plate spring 2 is inserted between the spring holding portions 5a and 5b from the lateral direction, the end of the lower spring holding portion 5b comes into contact with the rear surface of the plate spring 2 from below. Thus, the lower spring holding portion 5b supports a lower portion of the plate spring 2. The lower end of the upper spring holding portion 5a is provided with an engaging portion 6 on its back surface facing toward the one side wall 1A. The engaging portion 6 engages with an engaging aperture portion 12 of the plate spring 2 described below, when the plate spring 2 is inserted between the spring holding portions 5a and 5b.

The inner surface of the other side wall 1B is integrally formed with an elastic wall 18 protruding therefrom. This elastic wall 18 is also a press-fitting portion and defines an air space 17 between the elastic wall 18 and the other side wall 1B. Two press-fitting craw portions 9 and 9 are formed on the surface of the elastic wall 18 apart from each other. Accordingly, in the fourth embodiment, at the time of inserting the boss portion B into the inside of the clip 1, the elastic wall 18 (press-fitting portion) bends via the air space 17 toward the other side wall 1B to facilitate the insertion operation. Also, at the time of inserting the clip 1 itself into the mounting hole H of the automotive body panel P, the other side wall 1B bends through the air space 7 toward the elastic wall 18 to facilitate the insertion operation.

With respect to the plate spring 2, as shown in FIG. 10, the plate spring 2 is formed in a general V-shape, and is integrally provided with pull-out preventing tongues 11, extending from the lower edge obliquely downward and from the upper edge obliquely upward and provided with an engaging aperture portion 12, to be engaged with the engaging portion 6, around the central portion of the bottom of the V-shape. This plate spring 2 is also formed in a shape symmetrical about a horizontal axis and a vertical axis of the plate spring 2. In the fourth embodiment, at the time of attaching the plate spring 2 to the one side wall 1A, since the carefulness about the specific direction of the plate spring 2 can be relieved, the efficiency of the attaching operation can be improved.

Accordingly, by only inserting the metal plate spring 2, generally flat in cross-section between the upper spring holding portion 5a and the lower spring holding portion 5b respectively provided on the upper surface and the lower surface of the inside of the one side wall 1A, and engaging the engaging aperture portion 12 of the plate spring 2 with the engaging portion 6 formed on the back surface of the lower end of the upper spring holding portion 5a, the plate spring 2 can be attached to the clip 1. Thus, the attaching operation of the plate spring 2 to the clip 1 can be facilitated. Furthermore, the elastic structure of the upper spring holding portion 5a further facilitates the attaching operation.

At the time of securing a garnish G to an automotive body panel P using the clamp of the aforementioned fourth embodiment, in the same manner as in a conventional clamp, initially a boss portion B protruded from the rear surface of the garnish G is inserted in the clip 1. In this embodiment, however, even if the press-fitting craw portions 9 and 9 are formed on the inner surface of the elastic wall 18 of the other side wall 1B and the pull-out preventing tongue 11 of the plate spring 2 is protruded from the plate spring 2, the boss portion B can be easily inserted in the clip 1 since the elastic wall 18 can bend through the air space 17 toward the other side wall 18. Accordingly, as compared to the aforementioned conventional clamp, since the insertion operation of the boss portion B with respect to the clip 1 can be performed very easily, the insertion operation can be executed by hand.

Furthermore, while pull-out preventing tongue 11 of the plate spring 2 attached to the one side wall 1A is protruded toward the boss portion B, the pull-out preventing tongue 11 can be assuredly retained toward the boss portion B since the end of the rigid lower spring holding portion 5b comes into contact with the rear surface of the plate spring 2 in a backup state, to prevent the deformation of the pull-out preventing tongue 11 involved in the insertion operation of the boss portion B.

Figure 14:
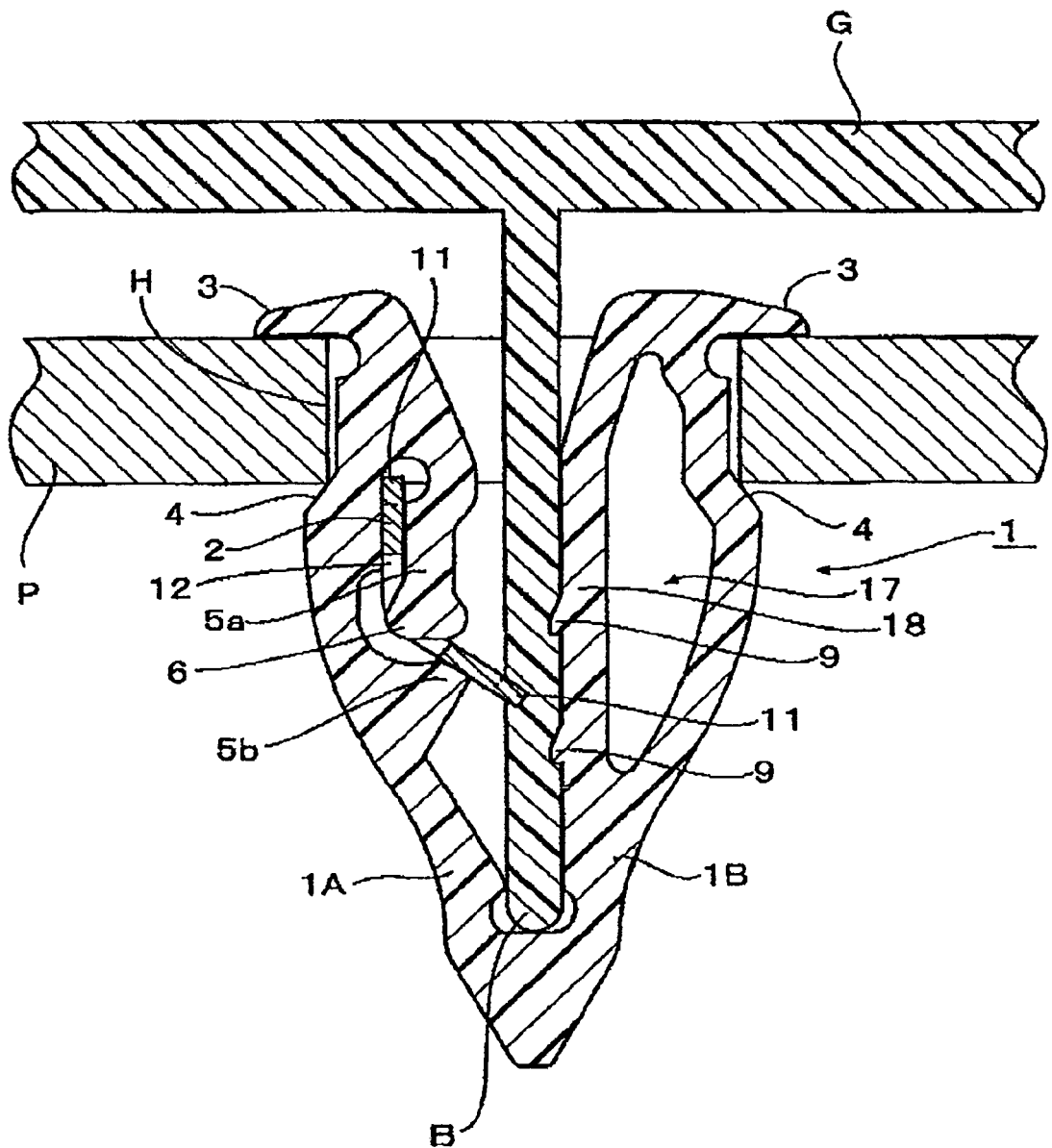
FIG. 14 is a cross-sectional view showing the state in which the garnish is fixed to an automotive body panel side.

When the boss portion B of the garnish G is inserted in the clip 1, as shown in FIG. 11, the pull-out preventing tongue 11 of the plate spring 2 attached to the one side wall 1A of the clip 1, bites into the corresponding portion of the boss portion B and at the same time, the two press-fitting craw portions 9 and 9 of the elastic wall 18 bite into the corresponding portions of the boss portion B while being pressed. Then, while keeping this engaged state, the clip 1 is inserted into the mounting hole H of the automotive body panel P so that, as shown in FIG. 14, the garnish G is assuredly secured to the automotive body panel P.

Moreover, at the time of inserting the clip 1 in the mounting hole H, since the other side wall 1B easily bends through the air space 17 toward the elastic wall 18 while the clip 1 is being inserted, the insertion operation of the clip 1 into the mounting hole H of the panel P can be facilitated.

In the fourth embodiment, the other side wall 1B is provided with the elastic wall 18 protruding from the inner surface of the other side wall 1B while the air space 17 exists between the walls 1B and 18. Thus, the vertical slits 7 as shown in the above first embodiment can be removed, and it is possible to extend the width of the elastic wall 18 to the same width as the other side wall 1B to firmly hold the boss portion B by the resulting wider area. While FIG. 12B shows an example of the elastic wall 18 having the same width as the other side wall 1B at the portion corresponding to the pull-out preventing tongue 11 of the plate spring 2, the present invention is not limited to this example. The entire elastic wall 18 can have the same width as the other side wall 1B.

Figure 15:
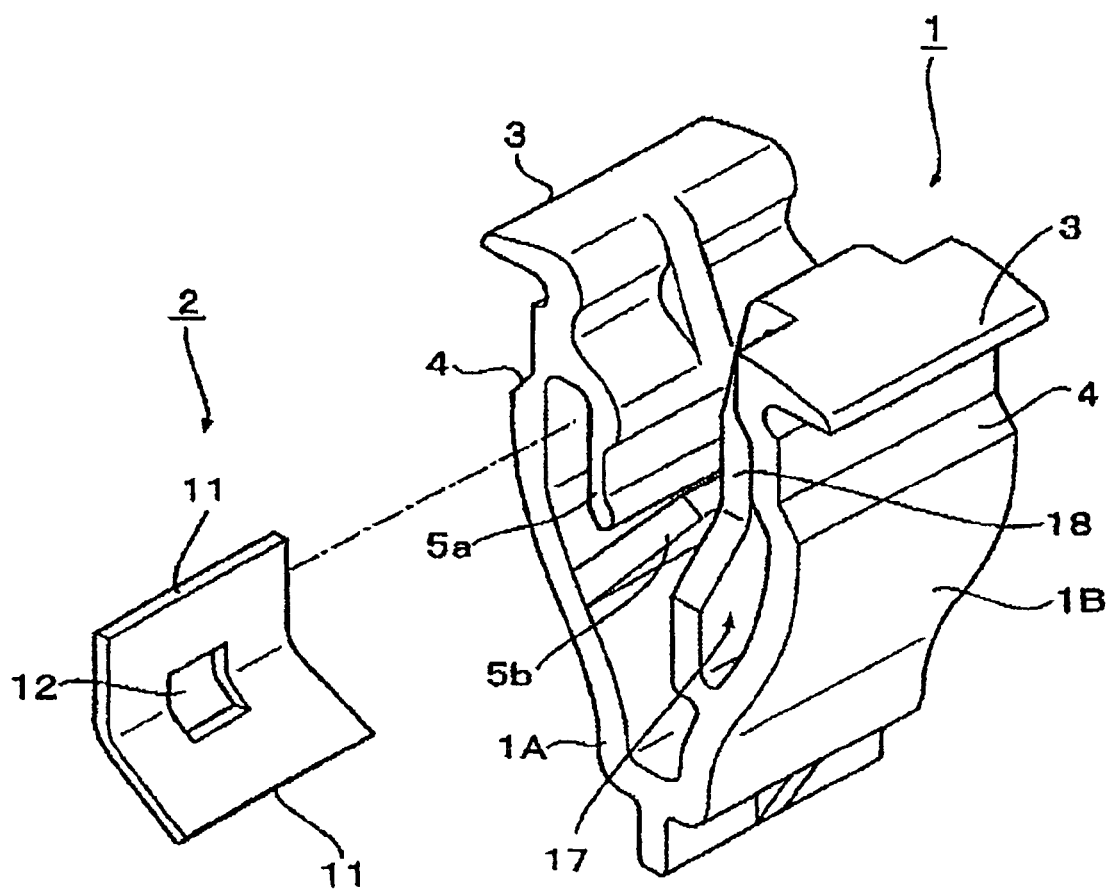
FIG. 15 is an exploded perspective view showing a clamp according to one embodiment of the present invention.

Finally, a clamp according to a fifth embodiment will be explained. The fifth embodiment is basically the same as the fourth embodiment but different from the fourth embodiment in the shape of the plate spring 2. In detail, as shown in FIG. 15, the plate spring 2 has a shape symmetrical about a horizontal axis and a vertical axis thereof, and its pull-out preventing tongue 11 is not provided with a tapered shape. The shape of the end of the plate spring 2 remains after the cut-off operation is performed. That is, the end of the plate spring 2 has a cutting-line shape. This cut-off shape of the pull-out preventing tongue 11 bites into the boss portion B which comprises a relatively soft material. The other structure, function and effects are similar to those of the fourth embodiment, and therefore the explanation will be omitted here.

The pull-out preventing tongue 11 of the plate spring 2 in the present invention is not limited to the tapered shape as shown in the first, second, third and fourth embodiments. The pull-out preventing tongue 11 may have the cut-off shape while having the same width as the other portion of the plate spring 2. In addition, the shape of the pull-out preventing tongue 11 can be formed by gradually decreasing the thickness or width of the plate spring 2 toward its end so that the pull-out preventing tongue can bite into the boss portion B. In summary, the pull-out preventing tongue 11 can have a shape such that it bites into and engages with the boss portion B stronger in one direction than the other direction.

In the above embodiments, a plurality of press-fitting craw portions 9 are formed integrally on the press-fitting portion such as the divided wall portion 8 and the elastic wall 18, and the boss portion B is clamped by the each press-fitting craw portion 9 and the pull-out preventing tongue 11 of the plate spring 2. However, the present invention is not limited to these embodiments. For example, similar function and effects can be obtained without the press-fitting craw portions 9 formed on the divided wall portion 8 and the elastic wall 18, by extending the length of the pull-out preventing tongue 11 of the plate spring 2 to increase the amount of the pull-out preventing tongue 11 biting into the boss portion B.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

We claim:

1. A clamp for securing a mounting member to a panel having a mounting hole utilizing a boss portion protruded from a rear surface of the mounting member, the clamp comprising:
   a synthetic clip of a generally U-shape in cross-section; and
   a metal plate spring of a generally flat in cross-section,
   wherein the clip comprises a pair of side walls opposed each other at a certain distance, engaging shoulder portions each formed at an outer surface of each of the side walls and configured to be engaged with a peripheral edge of the mounting hole of the panel at the time of securing the mounting member to the panel,
   wherein the metal plate spring is attached to only one of the side walls of the clip,
   wherein a press-fitting craw portion is formed at an inner surface of the other side wall and configured to be pressed directly against the boss portion of the mounting member at the time of securing the mounting member to the panel, and
   wherein the plate spring includes a pull-out preventing tongue facing the press-fitting craw portion and configured to bite into the boss portion of the mounting member at the time of securing the mounting member to the panel.

2. The clamp according to claim 1, wherein the other side wall is provided with an inwardly protruded portion at a free end thereof, whereby the inwardly protruded portion comes into contact with the boss portion of the mounting member when the clip is inserted in the mounting hole of the panel or the clip is pulled out of the mounting hole of the panel.

3. The clamp according to claim 2, wherein a protruded amount of the inwardly protruded portion is smaller than that of the press-fitting craw portion of the other side wall.

4. The clamp according to claim 1, wherein a plurality of press-fining craw portions are formed at an inner surface of the other side wall at different heights alternatively.

5. The clamp according to claim 1, wherein the one side wall is provided with a pair of spring holding portions for holding side edge portions of the plate spring.

6. The clamp according to claim 5, wherein the spring holding portions are integrally formed at both sides of the inner surface of the one side wall.

7. The clamp according to claim 5, wherein the spring holding portions are disposed at different heights.

8. The clamp according to claim 1, wherein an engaging portion is formed on an inner surface of the one side wall, and wherein the plate spring is provided with an engaging aperture to be engaged with the engaging portion.

9. The clamp according to claim 8, wherein the plate spring is provided with a pull-out preventing tongue extending obliquely downward from a lower edge of the plate spring, and wherein a width of the pull-out preventing tongue is set to be larger than a width of the engaging aperture.

10. The clamp according to claim 1, wherein a pair of vertical slits is formed in the other side wall to thereby form a divided wall portion, whereby the divided wall portion is deformed outwardly at the time of inserting the boss portion in the clip.

11. The clamp according to claim 1, wherein the one side wall is provided with a pair of spring holding portions for holding upper and lower edge portions of the plate spring, wherein the spring holding portions are disposed horizontally so that the plate spring is inserted between the spring holding portions from the lateral direction.

12. The clamp according to claim 11, wherein the plate spring has an engaging aperture at a central portion of the plate spring, a pull-out preventing tongue extending from a lower edge of the plate spring obliquely downward, and protruded ledges extending inwardly from lateral edges of the plate spring.

13. The clamp according to claim 1, wherein the one side wall is provided with an insertion aperture extending obliquely downward for inserting the plate spring, and wherein the plate spring includes a retaining portion configured to be engaged with a peripheral edge of the insertion aperture when the plate spring is inserted into the insertion aperture.

14. A clamp for securing a mounting member to a panel having a mounting hole utilizing a boss portion protruding from a rear surface of the mounting member, the clamp comprising:
   a synthetic clip generally U-shaped in cross-section; and
   a metal plate spring generally flat in cross-section, wherein the clip comprises a pair of side walls opposed each other at a certain distance, engaging shoulder portions each formed at an outer surface of each of the side walls and configured to be engaged with a peripheral edge of the mounting hole of the panel at the time of securing the mounting member to the panel, wherein the metal plate spring is attached to only one of the side walls of the clip, wherein a press-fitting portion to be pressed directly against the boss portion of the mounting member is provided at an inner surface of the other side wall and configured to define an inner air space between the other side wall and the press-fitting portion, and wherein the plate spring includes a bite-into portion facing the press-fitting portion and configured to bite into the boss portion of the mounting member at the time of securing the mounting member to the panel.

15. The clamp according to claim 14, wherein the one side wall having the metal plate spring attached is provided with a pair of spring holding portions for holding the plate spring wherein the pair of spring holding portions includes an upper spring holding portion and a lower spring holding portion wherein the lower spring holding portion comes into contact with the plate spring from below.

16. The clamp according to claim 14, wherein the one side wall having the metal plate spring attached is provided with a pair of spring holding portions for holding the plate spring wherein the pair of spring holding portions include an upper spring holding portion and a lower spring holding portion wherein the lower spring holding portion supports a lower portion of the plate spring.

17. The clamp according to claim 14, wherein the plate spring has a shape symmetrical about a horizontal axis and a vertical axis of the plate spring.

* * * * *